US011931764B2

(12) United States Patent
Zaki et al.

(10) Patent No.: US 11,931,764 B2
(45) Date of Patent: Mar. 19, 2024

(54) SPRAY GUN KIT, ASSOCIATED METHOD OF USE AND GUN

(71) Applicant: EXEL INDUSTRIES, Epernay (FR)

(72) Inventors: Mazen Zaki, Eragny sur Oise (FR); Saman Shohoudi, Paris (FR)

(73) Assignee: EXEL INDUSTRIES, Epernay (FR)

( * ) Notice: Subject to any disclaimer, the term of this patent is extended or adjusted under 35 U.S.C. 154(b) by 199 days.

(21) Appl. No.: 17/105,981

(22) Filed: Nov. 27, 2020

(65) Prior Publication Data

US 2021/0162438 A1 Jun. 3, 2021

(30) Foreign Application Priority Data

Nov. 29, 2019 (FR) ....................................... 1913481

(51) Int. Cl.
*B05B 9/04* (2006.01)

(52) U.S. Cl.
CPC ...................................... *B05B 9/04* (2013.01)

(58) Field of Classification Search
CPC .... B05B 9/01; B05B 9/03; B05B 9/04; B05B 7/12–129; B05B 7/2491; B05B 7/0815; B05B 7/1463; B05B 7/2478; B05B 7/0093; B05B 7/2437; B05B 7/2416; B05B 7/1413; B05B 12/002; B05B 7/2408; B05B 7/02; B05B 7/2424; B05B 7/0416; B05B 7/1263; B05B 7/2402; B05B 7/0408; B05B 9/0894; B05B 9/0805
USPC ............................................................... 239/1
See application file for complete search history.

(56) References Cited

U.S. PATENT DOCUMENTS

| | | | | |
|---|---|---|---|---|
| 3,090,530 | A | 5/1963 | Peeps | |
| 2015/0069147 | A1* | 3/2015 | Chen ..................... | B05B 7/2491 239/379 |
| 2018/0200741 | A1 | 7/2018 | Moews et al. | |
| 2019/0232308 | A1* | 8/2019 | Becker .................. | B05B 7/0093 |

FOREIGN PATENT DOCUMENTS

| | | | |
|---|---|---|---|
| EP | 3517215 | A1 | 7/2019 |
| WO | 2016180863 | A1 | 11/2016 |

OTHER PUBLICATIONS

INPI Rapport de Recherche Préliminaire for Patent Application No. FR 1913481, dated Jun. 19, 2020, 2 pp.

* cited by examiner

*Primary Examiner* — Qingzhang Zhou
*Assistant Examiner* — Juan C Barrera
(74) *Attorney, Agent, or Firm* — Soquel Group LLC

(57) ABSTRACT

A kit for a spray gun including a sleeve delimiting an inner volume provided to contain a pressurized fluid, the sleeve being configured to be connected to a main body of a spray gun, the sleeve having a radial periphery delimiting a fluid outlet of the sleeve and at least one orifice emerging on the radial periphery and fluidly connecting the inner volume and the radial periphery, a connector having an intake end connected to the fluid outlet and a connecting end suitable for being connected to a cup so as to fluidly connect the cup to the inner volume of the sleeve, and a ring surrounding the sleeve and covering the fluid outlet outside the intake end of the connector.

13 Claims, 5 Drawing Sheets

SPRAY GUN KIT, ASSOCIATED METHOD OF USE AND GUN

CROSS-REFERENCE TO RELATED APPLICATION

This application claims priority of French Patent Application No. 19 13481, filed on Nov. 29, 2019.

FIELD OF THE INVENTION

The present invention relates to a kit able to pressurize a fluid from a reservoir of a cup of a spray gun.

The present invention further relates to a method for using the kit for a spray gun and a gun including such a kit.

BACKGROUND OF THE INVENTION

The product is usually added into a cup gun by suction or by gravity, in particular by Venturi effect. In the case of a relatively viscous product, the cup can be pressurized.

Usually, a compressed air compressor is used to pressurize the fluid. The characteristics of the compressed air compressor are chosen based on the flow rate and pressure provided for the spray gun, in order to allow an optimal adaptation of the gun based on the fluid to be applied.

An additional pipe is thus provided between the body of the gun and the cup in order to pressurize the cup. A piercing is provided in the body of the gun to allow the connection of the additional pipe. However, this requires a dedicated gun having said piercing. In particular, such a gun is not adaptable for use with gravity.

SUMMARY OF THE DESCRIPTION

One aim of the invention is therefore to propose a kit for a spray gun able to pressurize a fluid of a reservoir of a cup of a spray gun, which is simple and practical to use.

Such a kit further makes it possible to adapt a spray gun for pressurized use without requiring piercing on the body of the gun.

To that end, the invention relates to a kit for a spray gun including:

a sleeve delimiting an inner volume, the inner volume being provided to contain a pressurized fluid, the sleeve being configured to be connected to a main body of a spray gun, the sleeve having a radial periphery, the sleeve being provided with at least one orifice, the or each orifice emerging on the radial periphery and fluidly connecting the inner volume and the radial periphery, the radial periphery delimiting a fluid outlet of the sleeve, a connector having an intake end and a connecting end, the intake end being connected to the fluid outlet of the sleeve, the connecting end being suitable for being connected to a cup so as to fluidly connect the cup to the inner volume of the sleeve, a ring surrounding the sleeve, the ring covering the fluid outlet on the radial periphery outside the intake end of the connector.

The connector then makes it possible to recover the pressure, at least partial, of a fluid in the location of the spray gun to pressurize the fluid included in the reservoir of a cup.

The kit for a spray gun may further have one or more of the features below, considered individually or according to any technical possible combination(s):

the or each orifice passes through the sleeve along a respective axis, the respective axis of the or each orifice forming, with the main extension axis of the sleeve, an angle inclusively between 30° and 90°, more particularly between 45° and 75°;

the kit includes a regulator able to control the pressure or the flow rate of fluid passing through the intake end;

the sleeve and/or the ring have a recess at the radial periphery, the or each orifice emerging in the recess;

the recess is at least partially hollowed in the sleeve, the recess forming the fluid outlet from the sleeve; and/or the ring and/or the sleeve are provided with O-rings located on either side of the recess.

The invention further relates to a method for using a kit for a spray gun as previously described, including the following steps:

providing a kit for a spray gun as previously described, providing a spray gun including a main body defining an open chamber and a cup defining a reservoir, fastening the sleeve on the main body such that the open chamber and the inner volume of the sleeve together define a single volume, and connecting the connecting end to the cup, so as to fluidly connect the inner volume of the sleeve to the reservoir of the cup.

The invention also relates to a spray gun including a main body, a cup and a kit for a spray gun as previously described, wherein the sleeve is connected to an open chamber of the main body, such that the open chamber and the inner volume of the sleeve together define a single volume, the cup defining a reservoir, the connecting end being connected to the cup, the inner volume of the sleeve being fluidly connected to the reservoir of the cup by the connector.

The spray gun may further have one or more of the features below, considered individually or according to any technical possible combination(s):

the gun includes a needle extending partially in the open chamber, the sleeve surrounding the needle, the inner volume of the sleeve being defined between the needle and the sleeve;

the open chamber is fluidly connected to a pressurized fluid inlet orifice;

the ring has at least one indexing element, the main body having at least one complementary indexing element provided to cooperate with the at least one indexing element to block the ring in at least one given position relative to the main body; and/or the ring rotates freely about a main axis around the sleeve, the given position of the ring corresponding to an angular position of the ring about the main axis.

BRIEF DESCRIPTION OF THE DRAWINGS

Other features and advantages of the invention will appear upon reading the following description of embodiments of the invention, solely as an example and done in reference to the drawings, in which.

DETAILED DESCRIPTION

Figure 1:
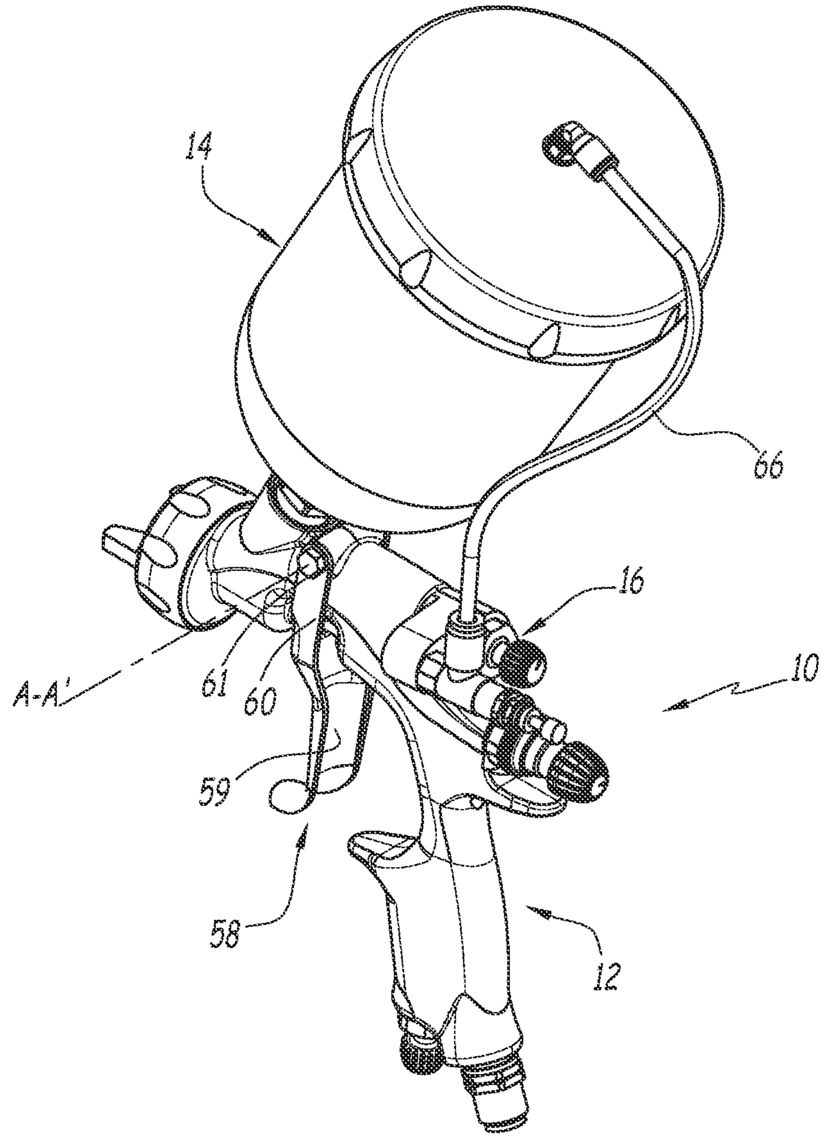
FIGS. 1 and 2 are respectively a perspective view and a sectional view of a spray gun including a kit able to pressurize a fluid of the reservoir of the cup according to a first embodiment of the invention.
Figure 2:
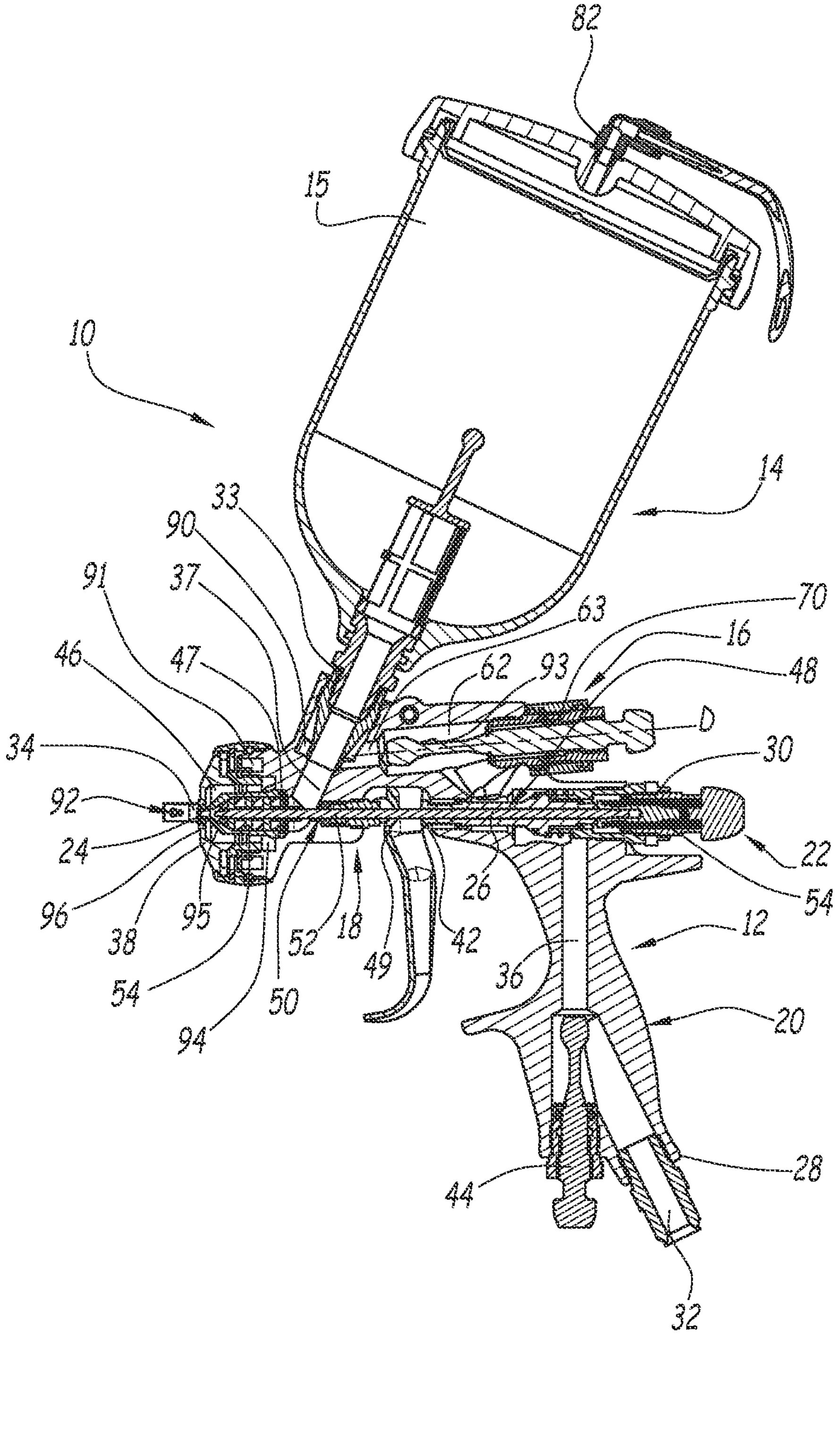

A spray gun 10 according to a first embodiment is shown in FIGS. 1 and 2.

Spray gun 10 is intended to spray a fluid product.

The fluid product preferably has a viscosity inclusively between 0.1 mPa·s and 100,000 mPa·s, more particularly between 1 and 1000 mPa·s.

Spray gun 10 includes a main body 12, a cup 14 and a kit for a spray gun 16.

Main body 12 has a first part 18, hereinafter called "barrel", comparable to the barrel of a gun, and a second part 20, hereinafter called "stock", comparable to the stock of a gun. In the illustrated example, body 12 also includes a third part 22, hereinafter called "breech", comparable to the breech of a gun.

Barrel 18 has a front end 24 that defines the front end of body 12.

Stock 20 extends from a rear end 26 of barrel 18.

Stock 20 here extends perpendicular to barrel 18.

Stock 20 has a distal end 28 opposite barrel 18. In other words, distal end 28 constitutes the end of stock 20 furthest from barrel 18.

Stock 20 forms a gripping handle of gun 10 by an operator.

Breech 22 extends from rear end 26 of barrel 18 in the extension of barrel 18.

Breech 22 defines a cavity 30 with stock 20 and barrel 18.

Body 12 defines an inlet orifice 32 for pressurized fluid, a supply orifice 33 for supplying gun 10 with a fluid product and a discharge orifice 34 for discharging the fluid product from gun 10.

Body 12 includes an inner duct 36 fluidly connecting pressurized fluid inlet orifice 32 to cavity 30.

Body 12 includes a supply duct 37 fluidly connecting supply orifice 33 to discharge orifice 34.

The pressurized fluid inlet orifice 32 is suitable for connecting a supply member (not shown) supplying gun 10 with a pressurized fluid, this supply member typically being made up of a flexible tube.

The pressurized fluid is for example air.

The pressurized fluid has a pressure greater than 200,000 hPa.

The pressurized fluid has a pressure less than 1,000,000 hPa.

The pressurized fluid inlet orifice 32 here is formed at distal end 28 of stock 20.

Supply orifice 33 is suitable for connecting a supply member for supplying gun 10 with a fluid product.

This supply member of the gun here is cup 14 including a reservoir 15 containing or able to contain the fluid product.

Cup 14 is connected to the second supply orifice by a connecting member.

The connecting member here includes a first end fitted in supply orifice 33 and a second end fitted in reservoir 15.

The fluid product is for example paint.

Supply orifice 33 here is delimited on barrel 18 of the gun.

Cup 14 extends above barrel 18, i.e., on an opposite side of barrel 18 relative to stock 20.

In an alternative embodiment that is not shown, cup 14 extends below barrel 18, i.e., on the same side of barrel 18 as stock 20.

Discharge orifice 34 is arranged in front end 24 of barrel 18.

Here, discharge orifice 34 is suitable for mounting a nozzle 38 for shaping the fluid product at the outlet of spray gun 10.

Inner duct 36 is housed in stock 20.

In the illustrated example, spray gun 10 includes a device for regulating the flow rate of the pressurized fluid in inner duct 36.

More specifically, spray gun 10 includes a needle 44 arranged in inner duct 36.

Inner duct 36, for example, includes a distal portion, here rectilinear, and a proximal portion, here rectilinear, inlet orifice 32 for pressurized fluid being arranged at the distal portion.

Needle 44 extends in the continuation of the proximal portion.

Needle 44 includes a closure member at the interface between the distal portion and the proximal portion and is able to regulate the flow rate of the pressurized fluid passing from the distal portion to the proximal portion. More specifically, the closure member is translatable to adjust the passage surface between the distal portion and the proximal portion.

Body 12 further has an actuating duct 42 from cavity 30 to discharge orifice 34.

In the illustrated example, actuating duct 42 extends along a main extension axis, here corresponding to the extension axis of barrel 18 and breech 22.

Actuating duct 42 defines a chamber 46 upstream of the discharge orifice 34.

Chamber 46 is provided with a seat 47 at the junction between chamber 46 and supply duct 37.

Seat 47 in particular has a shape flared toward chamber 46.

Actuating duct 42 has a narrowing 49 between cavity 30 and chamber 46, i.e., a portion in which the diameter of actuating duct 42 is strictly smaller than that of chamber 46 and that of cavity 30, the diameter being taken radially relative to the extension direction of duct 42.

Spray gun 10 includes an actuating system 48, actuating system 48 here being arranged in actuating duct 42.

Actuating system 48 includes a closure member 50 that is movable relative to body 12 between a released position of supply duct 37, in which it allows the circulation of the fluid product between supply orifice 33 and discharge orifice 34, and a closed-off position of supply duct 37, in which it opposes circulation of fluid product between supply orifice 33 and discharge orifice 34.

Closure member 50 is in particular translatable relative to body 12 between its released and closed off positions along the extension direction of actuating duct 42.

Closure member 50 includes a rod 52 extending in actuating duct 42, and a head 54 extending in chamber 46.

Supply duct 37 emerges at the inlet of chamber 46 opposite discharge orifice 34, upstream of head 54 of closure member 50.

Rod 52 has a diameter substantially equal to the diameter of narrowing 49 of actuating duct 42.

Closure member 50 forms a needle that bears against seat 47 when closure member 50 is in its closed-off position, and is separated from seat 47 when closure member 50 is in its released position. This offers great flexibility in the adjustment of the outlet flow rate of the fluid product coming from supply orifice 33 based on movement of closure member 50 between its closed-off and released positions.

Actuating system 48 further includes a member 54 for returning closure member 50 toward its closed-off position. This return member 54 here is formed by a compression spring oriented in the extension direction of breech 22, and compressed between, on the one hand, a bottom of breech 22 and, on the other hand, a stop secured to closure member 50.

Spray gun 10 includes a trigger 58 provided to activate actuating system 48 in the released position.

Trigger 58 includes a main branch 59 and two flanges 60.

Main branch 59 defines a gripping surface intended to receive at least one finger of an operator holding stock 20 in his palm.

Flanges 60 are spaced apart from one another and each extend upward from a respective lateral edge of main branch 59. Flanges 60 sandwich body 12, and more particularly barrel 18.

Trigger 58 is mounted pivoting about a transverse pivot axis A-A', relative to body 12, this pivot axis A-A' being, in the illustrated example, above barrel 18.

To that end, flanges 60 of trigger 58 are passed through by a common shaft 61 engaged through body 12. Common shaft 61 extends along pivot axis A-A'.

Common shaft 61 forms a pivot link between trigger 58 and body 12 such that trigger 58 is rotatable about pivot axis A-A' relative to body 12 between an actuated position, in which trigger 58 is moved toward stock 20 and closure member 50 is in its released position, and a priming position, in which trigger 58 is separated from stock 20 and closure member 50 is in its closed off position.

Body 12 further has a pressurized fluid passage duct.

The pressurized fluid passage duct includes a chamber 62.

Chamber 62 has a pressurized fluid outlet 63.

Outlet 63 here is delimited in front of chamber 62.

Outlet 63 is fluidly connected to at least one, here two, outlets 92 arranged at the discharge for the fluid product from the spray gun, for example, by an intermediate duct 90 and/or an intermediate chamber 91.

The intermediate duct here surrounds supply duct 37 and the intermediate chamber surrounds chamber 46 of actuating duct 42.

Additionally or alternatively, chamber 62 has a secondary outlet through at least one duct, here a plurality of ducts 93, arranged in a central portion of chamber 62. The secondary outlet is fluidly connected to at least one orifice 96 arranged at front end 24 of the barrel, for example, via one or several chambers 94, 95 surrounding chamber 46 of the actuating duct 42.

Chamber 62 is further fluidly connected to cavity 30, and thus to pressurized fluid inlet orifice 32.

Chamber 62 has an opening opposite its outlet 63 in an extension direction D of the chamber.

Kit 16 includes a sleeve 64, a connector 66 and a ring 68.

Sleeve 64 is, for example, in the general shape of a hollow cylinder.

Sleeve 64 extends along a main extension axis between a distal end and a proximal end.

Sleeve 64 delimits an inner volume 70, the inner volume being provided to contain a fluid.

Sleeve 64 has an outer circumferential surface 72, forming a radial periphery of sleeve 64, and an inner circumferential surface 74 delimiting inner volume 70.

Sleeve 64 includes a fluid outlet on its outer circumferential surface 72 as described hereinafter.

Outer circumferential surface 72 has a recess 73 on the circumference of sleeve 64, here a cylindrical recess.

Recess 73 is spaced apart from each of the distal and proximal ends of sleeve 64.

Inner circumferential surface 74 has a counterbore 75, here cylindrical. Counterbore 75 extends over part of inner circumferential surface 74 from the proximal end of sleeve 64.

Sleeve 64 delimits at least one orifice 76.

The or each orifice 76 passes through the wall of sleeve 64.

The or each orifice 76 emerges on radial periphery 72 and fluidly connects inner volume 70 and radial periphery 72.

The or each orifice 76 passes through sleeve 64 from outer circumferential surface 72 to inner circumferential surface 74.

More particularly, the or each orifice 76 fluidly connects recess 73 of outer circumferential surface 72 and counterbore 75 of inner circumferential surface 74.

Recess 73 here defines the fluid outlet of sleeve 64, here from inner volume 70.

Alternatively, in the absence of a recess, the fluid outlet of sleeve 64 is, for example, defined by the or each orifice 76 emerging in outer circumferential surface 72.

In the illustrated example, sleeve 64 delimits one or several orifices 76 distributed over the circumference of sleeve 64.

Each orifice 76 passes through sleeve 64 along a respective axis. The respective axis of each orifice 76 forms, with the main extension axis of sleeve 64, an angle inclusively between 30° and 90°, more particularly between 45° and 75°.

Orifices 76 here are more particularly distributed such that their respective axes are located on a same cone having, as generator, the main extension axis of sleeve 64.

Sleeve 64 is configured to be connected to main body 12.

More particularly, sleeve 64 here is connected to an open chamber of the main body, here chamber 62 of the pressurized fluid passage duct, such that the open chamber and the inner volume of the sleeve together define a single common volume.

The main extension axis of sleeve 64 extends along extension direction D of chamber 62.

More particularly, the proximal end of sleeve 64 is inserted into the opening of chamber 62 of the pressurized fluid passage duct.

The opening, for example, has a thread and a part of outer circumferential surface 72 of sleeve 64 has a complementary tapping from the proximal end of sleeve 64.

Spray gun 10 further has a needle 78 arranged in the inner volume of sleeve 64 and in open chamber 62, needle 78 being able to regulate the fluid passage between chamber 62 of the pressurized fluid passage duct and intermediate duct 90.

Needle 78 includes a closure member translatable in chamber 62 arranged to adjust the passage surface of outlet 63 of chamber 62.

Needle 78 cooperates with inner circumferential surface 74 of sleeve 64. Sleeve 64, for example, has a tapping on part of the inner circumferential surface 74 from the distal end, the needle having a complementary thread.

Needle 78 here occupies entire inner volume 70 of sleeve 64 with the exception of the volume defined by counterbore 75.

The pressurized fluid passage duct thus makes it possible to selectively insert pressurized fluid from pressurized fluid inlet orifice 32 toward outlet(s) 92 arranged at the discharge for the fluid product from the spray gun.

Connector 66 has an intake end 80 and a connecting end 82.

Connector 66 here includes a pipe extending between intake end 80 and connecting end 82.

Intake end 80 is directly connected to the fluid outlet of sleeve 64 on its radial periphery.

Connecting end 82 here is connected to cup 14 so as to fluidly connect cup 14, more particularly, reservoir 15, to the air outlet of sleeve 64.

Connector 66 is advantageously provided with a regulator 84 able to control the fluid pressure passing through intake end 80.

Regulator 84, for example, makes it possible to adjust the fluid passage such that the pressure of the fluid is inclusively between 0 and 6 bars.

Alternatively, regulator 84 is able to control the fluid flow rate passing through intake end 80.

Figure 3:
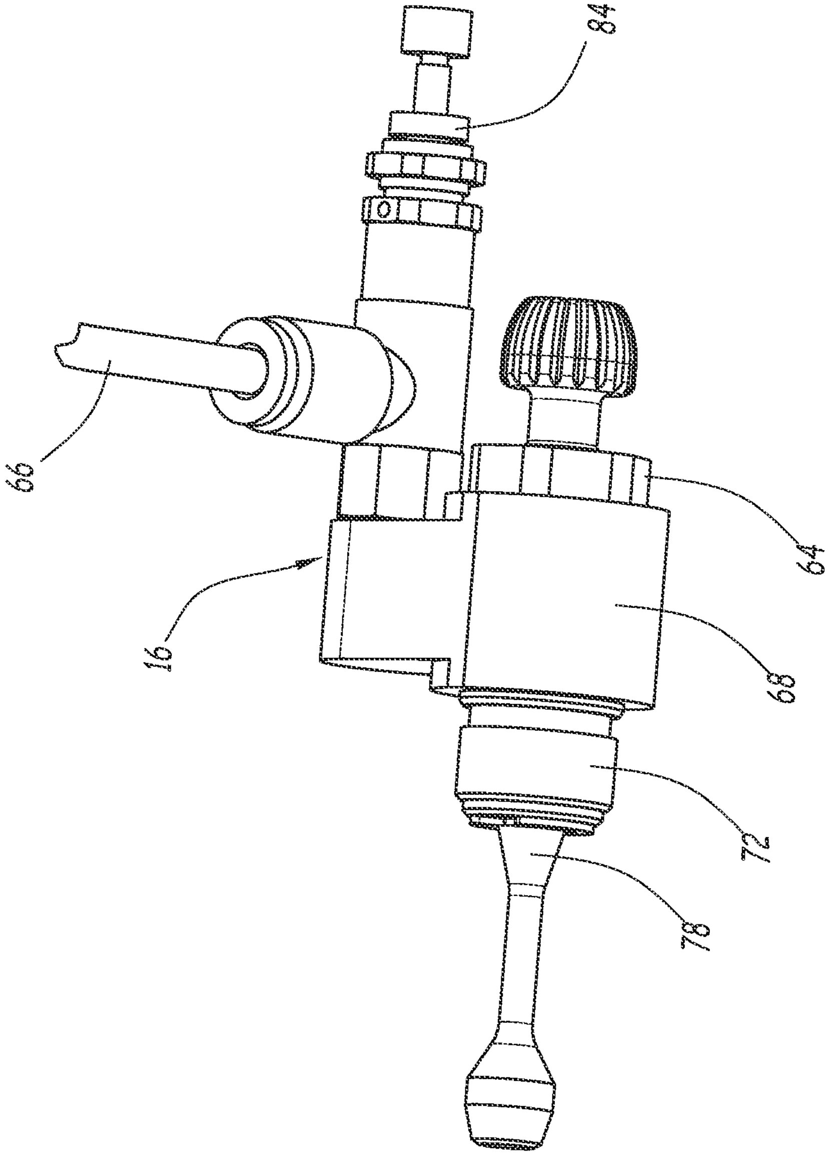
FIG. 3 is a perspective view of the kit surrounding a needle of the spray gun of FIG. 1.

In the example shown in FIGS. 1 to 3, regulator 84 is screwed directly at the outlet of ring 68.

Ring 68 surrounds sleeve 64.

Ring 68 covers the entire fluid outlet of sleeve 64 on the radial periphery, more particularly here recess 73, with the exception of the connection of intake end 80 of connector 66.

More particularly, ring 68 includes a cylindrical portion surrounding sleeve 64 at least around the fluid outlet of sleeve 64. The cylindrical portion includes a radial orifice for passage of intake end 80 of connector 66.

Ring 68 and/or sleeve 64 is provided with O-rings 86 located on either side of recess 73.

This, in particular, makes it possible to guarantee tightness between main body 12 and connector 66 via ring 68.

Such a kit makes it possible to withdraw pressurized fluid selectively in order to pressurize the fluid product contained in cup 14.

Fluid product 14 is, for example, placed under a pressure inclusively between 0 and 6 bars.

Ring 68 here further rotates freely about the main extension axis of sleeve 64 at least over a given angular interval.

The given angular interval is for example substantially equal to 180°.

Alternatively, the given angular interval is equal to 360°.

Ring 68 here rotates freely between a right position and a left position.

In the right position, intake end 80 of connector 66 is connected to sleeve 64 to the right of main body 12, more particularly, the pressurized fluid passage duct, relative to a user of the gun.

The tap of regulator 84 of connector 66 is then easily accessible from the right, in particular by the right hand of the user.

In the left position, visible in FIG. 1, intake end 80 of connector 66 is connected to sleeve 64 to the left of main body 12, more particularly, the pressurized fluid passage duct, relative to a user of the gun.

The tap of regulator 84 of connector 66 is then easily accessible from the right, in particular by the left hand of the gun.

This in particular makes it possible to adapt the spray gun, and more particularly the kit, to use by a right-handed person or a left-handed person.

In one advantageous embodiment, the ring has at least one indexing element, here two indexing elements.

The main body has at least one complementary indexing element, here a single complementary indexing element, provided to cooperate with the at least one indexing element to block ring 68 in at least one given position relative to main body 12.

The or each given position corresponds to an angular position of the given ring about the main axis.

More particularly here, the at least one given position includes the right position and the left position.

The indexing elements of the ring are, for example, flats, the complementary indexing element of main body 12 being a flat arranged to cooperate with a first of the flats of the ring in the right position and with a second of the flats of the ring in the left position.

Alternatively, the indexing elements of the ring are retractable fingers, the complementary indexing element of main body 12 being a hole provided to cooperate with a first of the fingers in the right position and with a second of the fingers in the left position.

Alternatively, the indexing elements of the ring are holes, the complementary indexing element of main body 12 being a retractable finger provided to be inserted into a first of the holes in the right position and into a second of the holes in the left position.

In an alternative embodiment that is not shown, the recess is hollowed in ring 68, more particularly, in an inner circumferential surface of ring 68 extending opposite outer circumferential surface 72 of sleeve 64.

Orifice 76 then fluidly connects outer circumferential surface 72 of sleeve 64 facing the recess hollowed in ring 68 and counterbore 75 of inner circumferential surface 74 of sleeve 64.

The alternative embodiment is otherwise similar.

In another alternative embodiment that is not shown, the recess is hollowed both in sleeve 64 and in ring 68, more particularly, in outer circumferential surface 72 of sleeve 64 and an inner circumferential surface of ring 68 extending opposite outer circumferential surface 72 of sleeve 64.

The alternative embodiment is otherwise similar.

Figure 4:
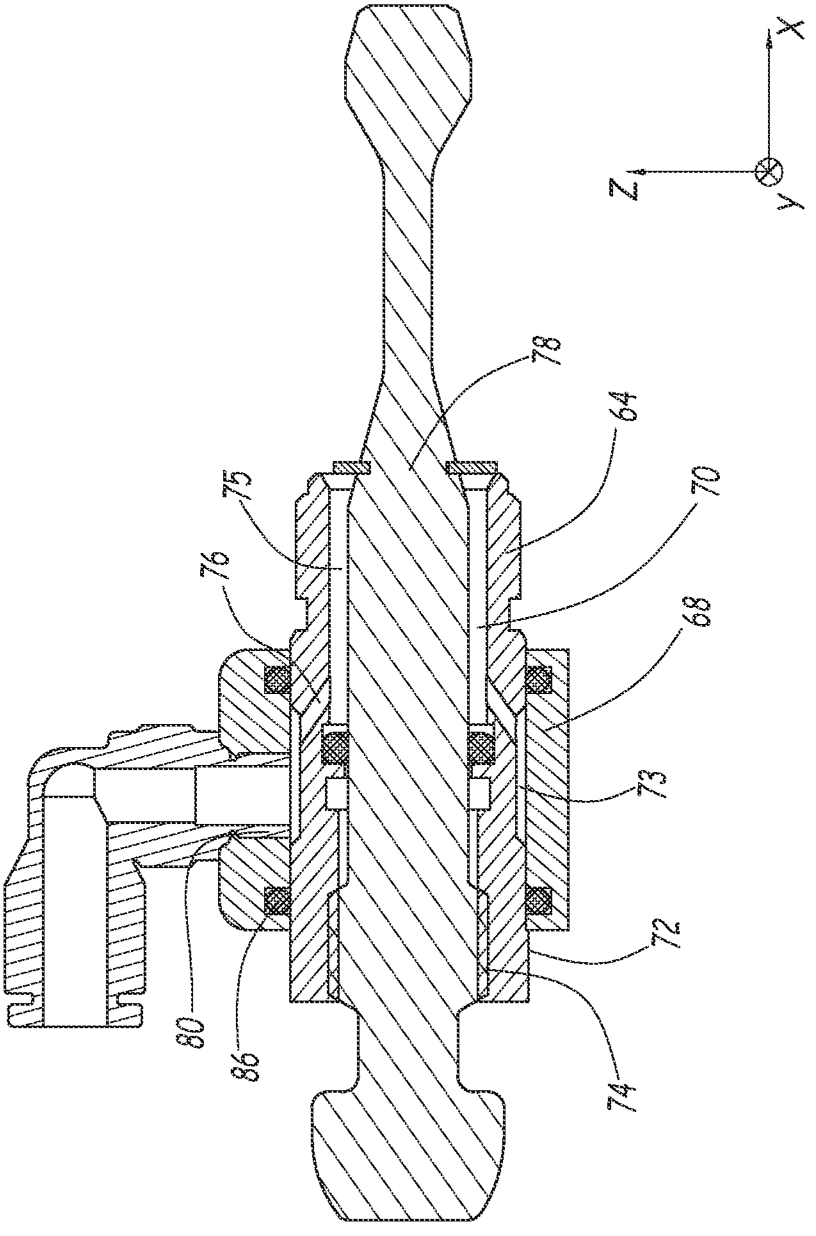
FIG. 4 is a sectional view of a ring and a sleeve of a kit of the invention according to a second embodiment, without regulator, surrounding a needle.

In one alternative embodiment, the regulator is mounted in line between kit 16 devoid of a regulator, for example, as shown in FIG. 4, and cup 14. More particularly, the regulator includes an inlet fluidly connected, for example, by a pipe, to the kit, more particularly, to the fluid outlet of the sleeve, and an outlet fluidly connected, for example by a pipe, to the cup.

Figure 5:
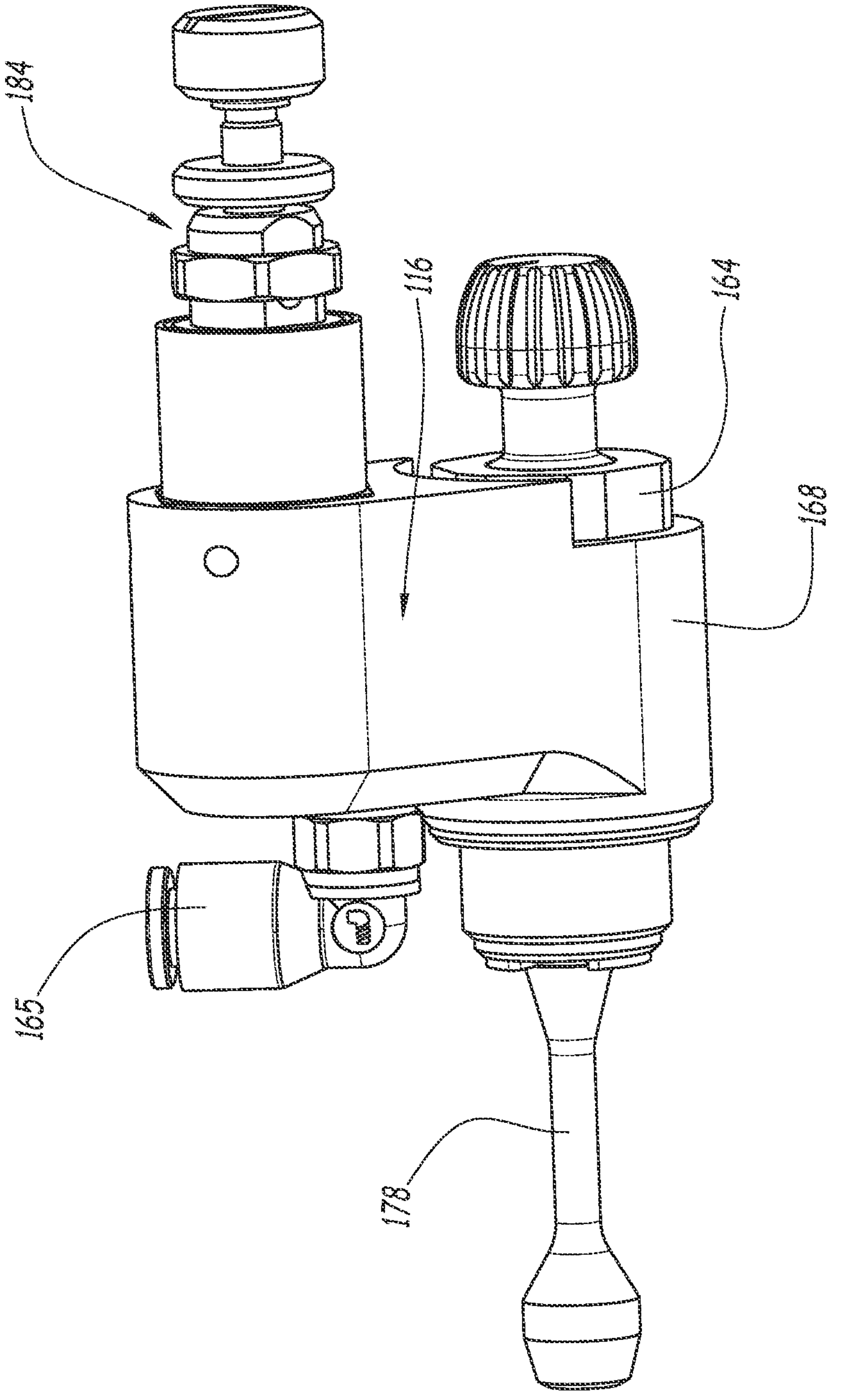
FIG. 5 is a perspective view of a kit surrounding a needle of the spray gun according to a third embodiment.

An exemplary kit alternative is shown in FIG. 5. Similar elements are referenced similarly with a reference incremented by 100. Only the points by which the alternative example differs from the kit previously described are described hereinafter.

Regulator 184 is incorporated directly into ring 168 of kit 116.

More particularly, regulator 184 is secured to the cylindrical portion surrounding sleeve 164.

The radial orifice of the cylindrical portion of ring 168 is fluidly connected to regulator 184.

Regulator 184 has an outlet 165 for connecting a pipe.

Regulator 184 is able to regulate the flow rate and/or the pressure of the fluid passing through it, i.e., between the radial orifice of the cylindrical portion of ring 168 and outlet 165.

The connector between the radial orifice of the cylindrical portion and the cup includes, in the example, regulator 184 and the pipe extending from outlet 165.

A method for using a kit for a spray gun as previously described will now be described.

The method includes:

providing a kit 16, 116 for a spray gun as previously described, providing a spray gun 10 including a main body 12 defining an open chamber 62 and a cup 14 defining a reservoir 15, fastening sleeve 64, 164 on main body 12 such that open chamber 62 and inner volume 70 of sleeve 64, 164 together define a single volume, and connecting connecting end 82 to cup 14, so as to fluidly connect inner volume 70 of sleeve 64, 164 to reservoir 15 of cup 14.

During the step for fastening the sleeve on the main body, the proximal end of sleeve 64, 164 here is inserted in the open chamber 62. More particularly, sleeve 64, 164 is screwed in the opening of chamber 62.

Needle 78, 178 is further inserted in inner volume 70 of sleeve 64, 164. More particularly, needle 78, 178 is screwed on the thread of inner circumferential surface 74.

The placement of the kit on the gun is particularly easy.

In one alternative embodiment, that is not shown, the spray gun is provided so that the pressurized kit is connected to another location of the gun.

The chamber of the pressurized fluid passage duct is, for example, closed directly by the needle fitted in the chamber, for example, using a sleeve.

The kit is, for example, provided to be fastened around needle 44 of pressurized fluid inlet orifice 32.

The kit can be provided to be fastened at the connector of inlet orifice 32.

Alternatively, the kit is provided to be fastened around cavity 30 of actuating duct 42.

Such a kit, therefore, makes it possible to adapt the spray gun easily to provide an intake of pressurized fluid toward the reservoir of the cup if needed.

Indeed, if no intake is necessary, the kit is able to be withdrawn, the chamber of the pressurized fluid passage duct being adapted to be closed directly by needle 78, for example, by fitting of the needle in the chamber, in particular using a sleeve.

Alternatively, if no intake is necessary, regulator 84 is adjusted such that the passage surface of a circumference in connector 66 is nil.

If an intake is necessary so as to pressurize the fluid in reservoir 15, the kit is easily placed on the gun in the desired location.

The connector then makes it possible to recover the pressure, advantageously selectively, of the pressurized fluid in the location of the spray gun to pressurize the fluid included in the reservoir of a cup.

The pressurized gun with the kit is further easily able to be manipulated by a user.

The invention claimed is:

1. A kit for a spray gun comprising:

a sleeve extending along a main extension axis, delimiting an inner volume, the inner volume being provided to contain a pressurized fluid, the sleeve being configured to be connected to a main body of the spray gun, the sleeve having a radial periphery, the sleeve being provided with at least one orifice, the at least one orifice emerging on the radial periphery and fluidly connecting the inner volume and the radial periphery, the radial periphery delimiting a fluid outlet of the sleeve;

a connector having an intake end and a connecting end, the intake end being connected to the fluid outlet of said sleeve, the connecting end being suitable for being connected to a cup so as to fluidly connect the cup to the inner volume of said sleeve; and a ring surrounding said sleeve, wherein said sleeve and/or said ring have a recess indented on the radial periphery, said at least one orifice emerging in the recess, wherein said ring and/or said sleeve are provided with O-rings located in front of and in back of the recess, where front and back are relative to the direction that the gun sprays, and wherein the ring covers the recess on the radial periphery outside the intake end of said connector, wherein the kit selectively withdraws the pressurized fluid from the inner volume, in order to pressurize a fluid product contained in the cup.

2. The kit according to claim 1, wherein said at least one orifice passes through said sleeve along a respective axis, the respective axis of said at least one orifice forming, with the main extension axis of said sleeve, an angle inclusively between 30° and 90°.

3. The kit according to claim 1, comprising a regulator able to control the pressure or the flow rate of fluid passing through said intake end of said connector.

4. The kit according to claim 1, wherein the recess is at least partially hollowed in said sleeve, the recess forming the fluid outlet from said sleeve.

5. A method for using a kit for a spray gun, comprising:

providing a kit according to claim 1 for the spray gun;

providing the spray gun, the spray gun comprising a main body defining an open chamber and a cup defining a reservoir;

fastening the sleeve of the kit on the main body of the spray gun such that the open chamber and the inner volume of the sleeve together define a single volume; and connecting the connecting end of the connector of the kit to the cup, so as to fluidly connect the inner volume of the sleeve to the reservoir of the cup.

6. A spray gun comprising:

a kit according to claim 1 for the spray gun, wherein the sleeve of the kit is connected to an open chamber of a main body, such that the open chamber and the inner volume of the sleeve together define a single volume, wherein a cup defines a reservoir, the connecting end of the connector of the kit being connected to the cup, and wherein the inner volume of the sleeve is fluidly connected to the reservoir of the cup by the connector;

the main body; and the cup.

7. The spray gun according to claim 6, further comprising a needle extending partially in the open chamber, the sleeve surrounding the needle, the inner volume of the sleeve being defined between the needle and the sleeve.

8. The spray gun according to claim 6, wherein the open chamber is fluidly connected to a pressurized fluid inlet orifice.

9. The kit for a spray gun according to claim 1, wherein the sleeve has an outer circumferential surface and an inner circumferential surface, the outer circumferential surface forming the radial periphery, the inner circumferential surface delimiting the inner volume.

10. The kit for a spray gun according to claim 9, wherein the recess is on the outer circumferential surface of the sleeve.

11. The kit for a spray gun according to claim 10, wherein the orifice fluidly connects the recess of the outer circumferential surface and the inner volume.

12. The kit for a spray gun according to claim 1, the O-rings are located on opposite sides of the recess relative to the main extension axis.

13. The kit for a spray gun according to claim 1, wherein the recess is cylindrical.

* * * * *